United States Patent
Sobko et al.

(10) Patent No.: US 7,559,086 B2
(45) Date of Patent: *Jul. 7, 2009

(54) SYSTEM AND METHOD FOR DETECTING MULTI-COMPONENT MALWARE

(75) Inventors: Andrey V. Sobko, Moscow (RU); Mikhail A. Pavlyushchik, Moscow (RU)

(73) Assignee: Kaspersky Lab, ZAO, Moscow (RU)

( * ) Notice: Subject to any disclaimer, the term of this patent is extended or adjusted under 35 U.S.C. 154(b) by 0 days.

This patent is subject to a terminal disclaimer.

(21) Appl. No.: 11/866,302

(22) Filed: Oct. 2, 2007

(65) Prior Publication Data

US 2009/0126016 A1    May 14, 2009

Related U.S. Application Data (63) Continuation of application No. 11/865,808, filed on Oct. 2, 2007.

(51) Int. Cl.
*G08B 23/00*    (2006.01)

(52) U.S. Cl. ............................. 726/24; 726/22; 726/23

(58) Field of Classification Search ........................ None
See application file for complete search history.

(56) References Cited

U.S. PATENT DOCUMENTS

| | | | | |
|---|---|---|---|---|
| 5,278,901 | A * | 1/1994 | Shieh et al. ..................... | 726/22 |
| 5,999,723 | A * | 12/1999 | Nachenberg .................. | 703/22 |
| 6,775,780 | B1 | 8/2004 | Muttik et al. | |
| 7,089,428 | B2 | 8/2006 | Farley et al. | |
| 7,093,239 | B1 * | 8/2006 | van der Made ............. | 717/135 |
| 7,103,913 | B2 | 9/2006 | Arnold et al. | |
| 7,146,305 | B2 * | 12/2006 | van der Made ............... | 703/22 |
| 7,231,667 | B2 | 6/2007 | Jordan et al. | |
| 7,243,373 | B2 | 7/2007 | Muttik et al. | |
| 2002/0078368 | A1 * | 6/2002 | Yann et al. .................. | 713/200 |
| 2003/0115479 | A1 | 6/2003 | Edwards et al. | |
| 2003/0212902 | A1 * | 11/2003 | van der Made ............. | 713/200 |
| 2004/0133796 | A1 * | 7/2004 | Cohen et al. ................. | 713/200 |
| 2004/0243829 | A1 * | 12/2004 | Jordan ......................... | 713/200 |
| 2004/0255165 | A1 * | 12/2004 | Szor ............................ | 713/201 |
| 2006/0031673 | A1 | 2/2006 | Beck et al. | |
| 2006/0265746 | A1 | 11/2006 | Farley et al. | |

(Continued)

OTHER PUBLICATIONS

Lee et al. Behavior Classification May 2006 EICAR Conference pp. 1-17.*

(Continued)

*Primary Examiner*—Matthew B Smithers
*Assistant Examiner*—David J Pearson (57) ABSTRACT

Malicious behavior of a computer program is detected using an emulation engine, an event detector and an event analyzer. The emulation engine includes a system emulator configured to emulate, in an isolated computer environment, at least a part of a computer system and a program emulator configured to emulate in the isolated computer environment execution of the computer program, including execution of a plurality of executable components of the computer program, such as execution processes and threads. The event detector is configured to monitor events being generated by two or more of the executable components. The event analyzer is configured to determine, substantially in real time, based at least on one or more events generated by each of two or more of the plurality of executable components whether or not the computer program exhibits malicious behavior, wherein individually one or more of the plurality of executable components may exhibit benign behavior.

20 Claims, 6 Drawing Sheets

U.S. PATENT DOCUMENTS

2007/0169197 A1    7/2007    Horne

OTHER PUBLICATIONS

Kurt Natvig SandboxII: Internet Sep. 2002 Virus Bulletin Conference pp. 1-18.*

Willems et al. Toward Automated Dynamic Malware Analysis Using CWSandbox Mar. 2007 IEEE Security and Privacy, vol. 5, No. 2 pp. 32-39.*

Mori et al. A Tool for Analyzing and Detecting Malicious Mobile Code May 20-28, 2006 ICSE '06 pp. 831-834.*

Akira Mori Detecting Unknown Computer Viruses—A New Approach Nov. 2, 2004 Lecture Notes in Computer Science Springer Berlin/Heidelberg vol. 3233/2004 pp. 226-241.*

Prabhat Singh et al., "The International Publication on Computer Virus Prevention, Recognition and Removal," Virus Bulletin, Dec. 2004; pp. 8-12.

Eric Uday Kumar et al., "The International Publication on Computer Virus Prevention, Recognition and Removal," Apr. 2005.

Peter Ferrie, "Fighting Malware and Spaml," Virus Bulletin, Feb. 2007 pp. 4-5. USA.

Manuel Egele et al., "Dynamic Spyware Analysis," Secure Systems Lab, 2007.

* cited by examiner

SYSTEM AND METHOD FOR DETECTING MULTI-COMPONENT MALWARE

CROSS-REFERENCE TO RELATED APPLICATIONS

This is a continuation application of U.S. patent application Ser. No. 11/865,808 for "System and Method For Detecting Multi-Component Malware" to Monastyrsky et al. filed on Oct. 2, 2007, which is incorporated herein by reference.

TECHNICAL FIELD

The present application relates generally to the field of malware detection and more particularly to heuristic analysis of computer programs for detecting multi-component malware.

BACKGROUND

Computer malware, such as viruses, worms and Trojan horses, presents one of the most significant security threats to computer systems. For example, it is estimated that yearly financial losses of U.S. businesses caused by malware is in the tens of billions of dollars. To combat the increasing spread of computer malware, a number of antivirus detection techniques have been developed. One of the most effective techniques for detecting computer malware is a heuristic analysis of computer programs. Heuristic analysis is a behavior-based technique in which a computer program is emulated in a secure computer environment, e.g. a virtual computer, thereby simulating what would happen if the program were to be executed while keeping the suspicious code isolated from the real-world machine. Behavior of the emulated program is analyzed for common malicious actions such as replication, file overwrites, and attempts to hide the existence of the suspicious file. If one or more malicious actions are detected, the program is flagged as potential malware. This analysis enables detection of various classes of malware.

Heuristic analysis techniques, however, may fail to detect some forms of a newly emerging breed of multi-component malware. During execution, multi-component malware launches several executable components, such as subprograms, numerous parallel processes and remote threads, of the main computer program. Some components may exhibit benign behavior attributable to non-malware programs in order to fool antivirus software into concluding that the program is harmless, while other components may be malicious. By emulating each of the executable components and performing heuristic analysis thereof, the multi-component malware may be detected. However, a heuristic analysis may fail to detect malware in which the malicious code is distributed between several executable components, wherein each executable component may exhibit signs of benign behavior, while the overall actions of the program are malicious. Accordingly, there is a need for detecting such multi-component malware.

SUMMARY

Disclosed are systems and methods for detecting multi-component malware using heuristic analysis of events generated during execution of one or more executable components of an emulated computer program. Specifically, a computer program may be emulated in a secure computer environment. Emulation of the computer program includes emulation of all executable components of the computer program, such as processes, threads and the like. During emulation, events generated by each executable component are compared to various patterns of events attributed to known malicious programs, such as viruses, worms and the like. However, instead of or in addition to individual analysis of the behavior of each executable component, the totality of events across multiple executable components is analyzed. In this manner, programs in which malicious functionality is distributed across several executable components may be detected, even though individual executable components may not exhibit signs of malicious behavior.

In one example embodiment, a system for detecting malicious behavior of a computer program includes an emulation engine, an event detector and an event analyzer. The emulation engine includes a system emulator configured to emulate in an isolated computer environment at least a part of a computer system and a program emulator configured to emulate in the isolated computer environment execution of the computer program, including execution of a plurality of executable components of the computer program. The event detector is configured to monitor events being generated by two or more of the executable components. The event analyzer is configured to determine, substantially in real time, based at least on one or more events generated by each of two or more of the plurality of executable components whether or not the computer program exhibits malicious behavior. Individually one or more of the plurality of executable components of the computer program may exhibit benign behavior.

The program emulator is configured to execute the one or more of the plurality of executable components in parallel or consecutively. The event analyzer is configured to compare the one or more events generated by each of two or more of the plurality of executable components with a pattern of events associated with a malicious program. The program emulator is configured to emulate execution of the computer program even when execution of one or more of the plurality of executable components is terminated. The event detector is configured to detect at least one of one or more program's system calls and one or more system responses to the system calls. The executable component includes one or more of a main process of the computer program, a child process of the computer program, a subprogram of the computer program, a program called by the computer program, and a dynamic link library associated with the computer program.

In another example embodiment, a computer-implemented method for detecting malicious behavior of a computer program includes emulating at least a part of a computer system in an isolated computer environment. Then, emulating execution of the computer program in the isolated computer environment, including emulating execution of a plurality of executable components of the computer program. The method further includes monitoring events being generated by two or more of the plurality of executable components and determining, substantially in real time, based at least on one or more events generated by each of two or more of the plurality of executable components, whether or not the computer program exhibits malicious behavior.

Yet in another example embodiment, disclosed is a computer-readable medium having computer-executable instructions for detecting malicious behavior of a computer program. The computer-readable medium include instructions for emulating in an isolated computer environment at least a part of a computer system. The medium further includes instructions for emulating execution of the computer program in the isolated computer environment, including instructions for emulating execution of a plurality of executable components of the computer program. The medium also includes instructions for monitoring events being generated by two or more of the plurality of executable components. The medium further includes instructions for determining, substantially in real time, based at least on one or more events generated by each of two or more of the plurality of executable components whether or not the computer program exhibits malicious behavior.

Yet in another example embodiment, a system for detecting malicious behavior of a computer program includes an emulation engine, an event detector and an event analyzer. The system emulator is configured to emulate in an isolated computer environment at least a part of a computer system. The program emulator is configured to emulate in the isolated computer environment execution of the computer program, including execution of a first process and a second process of the computer program. The event detector is configured to monitor events being generated by the first and second processes. The event analyzer is configured to determine, substantially in real time, based on at least one or more events generated by the first process and one or more events generated by the second process, whether or not the computer program exhibits malicious behavior.

Yet in another example embodiment, a computer-implemented method for detecting malicious behavior of a computer program includes emulating at least a part of a computer system in an isolated computer environment. The method further includes emulating execution of the computer program in the isolated computer environment, including emulating execution of the first process and second processes of the computer program. The method also includes monitoring events being generated by the first process and second processes of the computer program. The method further includes determining, substantially in real time, based on at least one or more events generated by the first process and one or more events generated by the second processes whether or not the computer program exhibits malicious behavior.

Yet in another example embodiment, disclosed is a computer-readable medium comprising computer-executable instructions for detecting malicious behavior of a computer program. The medium includes instructions for emulating in an isolated computer environment at least a part of a computer system. The medium further includes instructions for emulating execution of the computer program in the isolated computer environment, including instructions for emulating execution of a first process and a second process of the computer program. The medium also includes instructions for monitoring events being generated by the first process and second process of the computer program. The medium further includes instructions for determining, substantially in real time, based on at least one or more events generated by the first process and one or more events generated by the second processes whether or not the computer program exhibits malicious behavior.

Yet in another example embodiment, a system for detecting malicious behavior of a computer program includes an emulation engine, an event detector and an event analyzer. The system emulator is configured to emulate in an isolated computer environment at least a part of a computer system. The program emulator is configured to emulate in the isolated computer environment execution of the computer program, including execution of a first remote thread and a second remote thread of the computer program. The event detector is configured to monitor events being generated by the first and second remote threads. The event analyzer is configured to determine, substantially in real time, based on at least one or more events generated by the first remote thread and one or more events generated by the second remote thread, whether or not the computer program exhibits malicious behavior.

Yet in another example embodiment, a computer-implemented method for detecting malicious behavior of a computer program includes emulating at least a part of a computer system in an isolated computer environment. The method further includes emulating execution of the computer program in the isolated computer environment, including emulating execution of the first remote thread and second remote thread of the computer program. The method also includes monitoring events being generated by the first remote thread and second remote thread of the computer program. The method further includes determining, substantially in real time, based on at least one or more events generated by the first remote thread and one or more events generated by the second remote thread, whether or not the computer program exhibits malicious behavior.

Yet in another example embodiment, disclosed is a computer-readable medium comprising computer-executable instructions for detecting malicious behavior of a computer program. The medium includes instructions for emulating in an isolated computer environment at least a part of a computer system. The medium further includes instructions for emulating execution of the computer program in the isolated computer environment, including instructions for emulating execution of a first remote thread and a second remote thread of the computer program. The medium also includes instructions for monitoring events being generated by the first remote thread and second remote thread of the computer program. The medium further includes instructions for determining, substantially in real time, based on at least one or more events generated by the first remote thread and one or more events generated by the second remote thread whether or not the computer program exhibits malicious behavior.

BRIEF DESCRIPTION OF THE DRAWINGS

The accompanying drawings, which are incorporated into and constitute a part of this specification, illustrate one or more examples of embodiments and, together with the description of example embodiments, serve to explain the principles and implementations of the embodiments.

In the drawings.

DETAILED DESCRIPTION OF EXAMPLE EMBODIMENTS

Example embodiments are described herein in the context of a system and method for detecting malicious behavior of a computer program. Those of ordinary skill in the art will realize that the following description is illustrative only and is not intended to be in any way limiting. Other embodiments will readily suggest themselves to such skilled persons having the benefit of this disclosure. Reference will now be made in detail to implementations of the example embodiments as illustrated in the accompanying drawings. The same reference indicators will be used to the extent possible throughout the drawings and the following description to refer to the same or like items.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1:
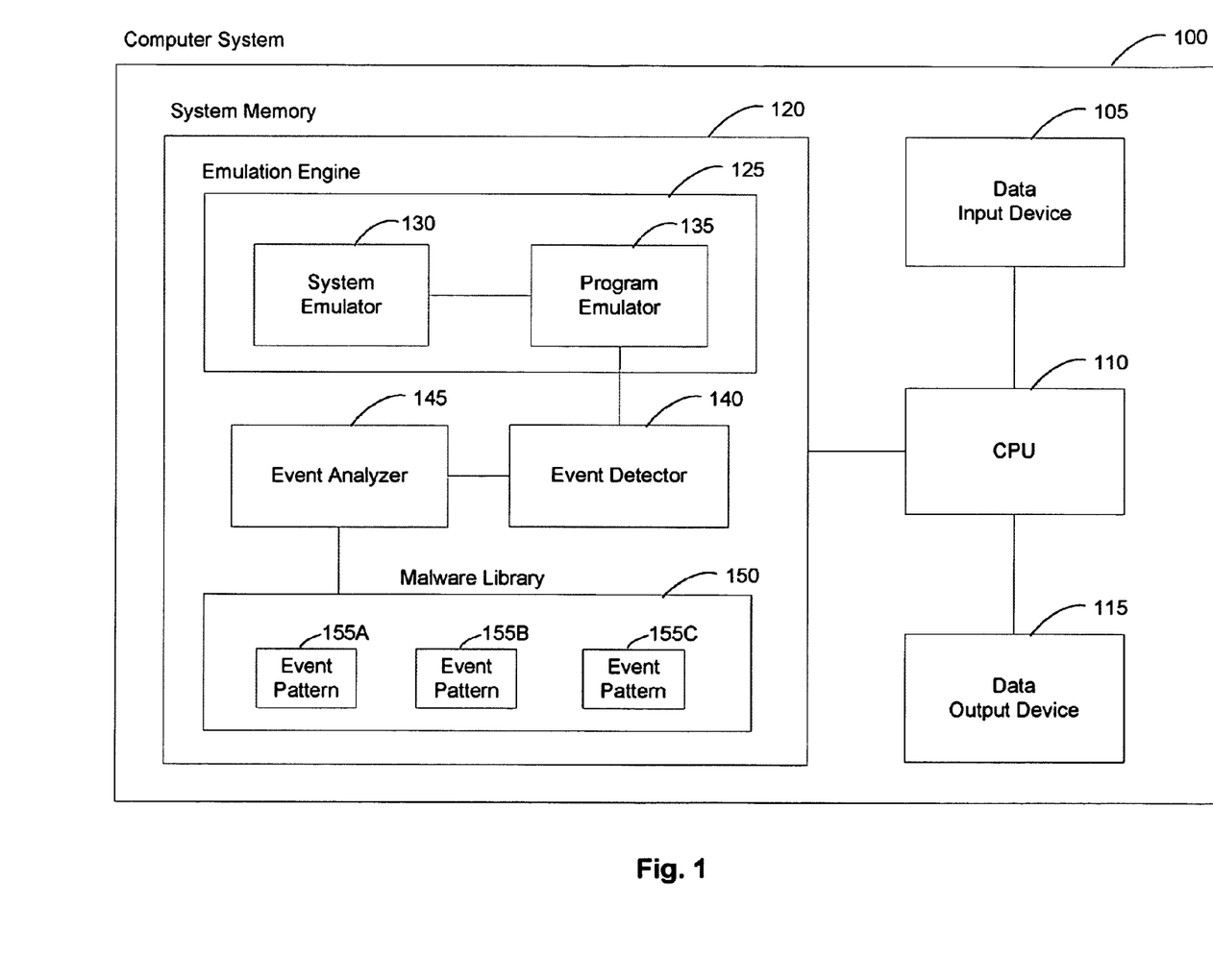
FIG. 1 illustrates an example computer system for detecting a multi-component malware.

FIG. 1 illustrates an example embodiment of a computer system for detecting multi-component malware. The computer system 100 may be a desktop computer, a mobile computer, a personal digital assistant, a network server, an email server, or a network firewall configured to scan input computer programs for malware, such as viruses, worms, Trojan horses and other types of harmful or unwanted programs and files. In one embodiment, computer system 100 may include a central processing unit (CPU), such as an Intel® Dual-Core™ or Pentium® processors, an AMD Turion™ 64 processor or other types of CPU. The system 100 further includes a data input device 105 for receiving a computer program to be scanned for malware. The data input device may include a keyboard, a network interface, such as IEEE 802.3 and IEEE 802.11 network cards, or cellular network interface, such as a GSM or CDMA network card, or a magnetic, optical or flash drive. The system 100 further includes a data output device 105, such as a computer monitor or one or more of the aforementioned network interfaces. The system 100 also includes a memory 120, such as a random access memory (RAM), a read only memory (ROM), a programmable ROM (PROM), an erasable PROM (EPROM), a FLASH-EPROM and other types of dynamic, volatile and nonvolatile information storage medium. The system 100 may run an operating system (OS), such as Windows XP® or other type of OS.

In one example embodiment, the computer system 100 may have an antivirus software (or program) installed thereon for detecting multi-component malware. Once loaded and installed on the computer system 100, the antivirus software may reside in system memory 120. In one example embodiment, the antivirus software may include one or more software components, including emulation engine 125, which may include system emulator 130 and program emulator 135, event detector 140, event analyzer 145 and malware library 150, which may include one or more patterns of events 155 associated with various types of malware, such as viruses, worms, Trojan horses and other types of malware. It should be noted that prior to execution the antivirus software may be stored in a non-volatile memory on a magnetic, optical or flash drive. After the antivirus program is loaded and launched on the computer system 100, one or more of the above-identified software components, as well as various subprograms, dynamic linked libraries (DLLs) and other related programs and files, may be executed from the system's random access memory (RAM) while others may be executed from a virtual memory created from a portion of the non-volatile storage medium. The components of the antivirus software will be described next.

Figure 2:
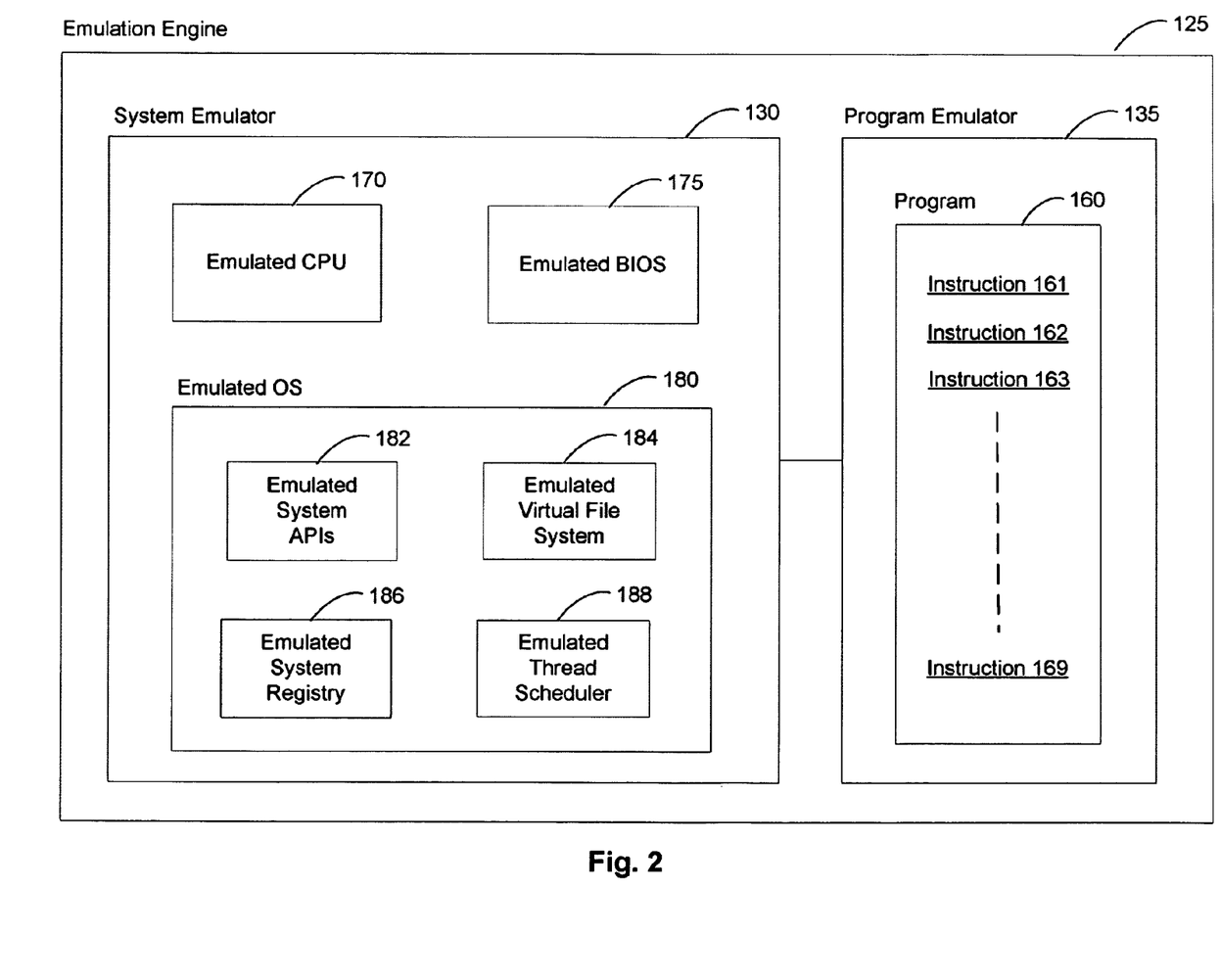
FIG. 2 illustrates an example emulation engine for detecting a multi-component malware.

With reference to FIG. 2, depicted is an example embodiment of emulation engine 125 for detecting multi-component malware. More specifically, emulation engine 125 facilitates emulation of a computer program in order to detect malicious behavior therein. To that end, emulation engine 125 includes a system emulator 130 and a program emulator 135. System emulator 130 is configured to emulate one or more components of a computer system in an isolated, secure computer environment of the computer system 100. For example, a portion of the random access memory of the computer system 100 may be used to create such an isolated, secure computer environment for emulation of computer programs. System emulator 130 may emulate several components of a computer system, including but not limited to CPU 170, BIOS 175 and OS 180, which may include system APIs 182, such as Win32 APIs and the like, virtual file system 184, system registry 186 and thread scheduler 188. In one embodiment, the emulated components of the emulated computer system may be substantially identical to those of the computer system 100. In another embodiment, the components of the emulated computer system may be somewhat different or substantially different from those of the computer system 100.

The emulation engine 125 further includes program emulator 135 configured to emulate execution of one or more programs 160 in an isolated, secure environment of the computer system 100 using emulated components of the system emulator 130. In one embodiment, program emulator 135 may be implemented as part of system emulator 130. In another embodiment, the program emulator may be implemented as a separate software component. Program emulator 135 may be operable to load a computer program 160 from system memory 120 or another local or remote location into the portion of RAM allocated to the isolated, secure computer environment in which emulation of the computer program 160 is to be performed. Prior to emulation, program emulator 135 may scan program 160 to determine that system simulator 130 contains all necessary resources for emulation of the program. If program 160 is compressed, the program emulator 135 may perform necessary decompression and other procedures. Program emulator 135 then begins reading instructions of computer program 160, such as instructions 161 through 169 and sends them for emulation to system emulator 130.

In order to detect multi-component malware, system emulator 130 is configured to emulate execution of one or more executable components of the computer program 160. Various executable components may include the program 160 itself and various copies of program 160, which may be created during program emulation. Executable components may also include subprograms of program 160, which may operate semi-independently of the program 160 and perform certain tasks, which may be different but related to those of program 160. Executable components may also include related or unrelated programs, applications or files called by program 160 in the course of program execution. For example, program 160 may call Internet Explorer® application to connect and download a file from the Internet or activate Microsoft Outlook® to retrieve some email information. Executable components may also include dynamic link libraries (DLL) used by program 160, such as Windows DLL and others. Those skilled in the art will recognize that the above list of examples of executable components is not exhaustive and there are other types of programs, files, applications, scripts, macros and the like that may be used by computer program 160 and thus emulated concurrently therewith.

There are several ways in which various executable components of the program 160 may be executed in the emulation engine 125. For example, various executable components may be executed as a main process of program 160, as various child processes of the main process, as grandchild processes of the main process and so on. A computer process may be defined as an instance of execution of the computer program 160. A child process may be defined as a computer process created by another process (the parent process). In another example, executable components of the program 160 may be executed as one or more threads of execution, including one or more remote threads. Various executable components of computer program 160 may be executed consecutively and/or in parallel with each other. To enable parallel execution of several processes, which generally increases the speed of program emulation, the system emulator 130 may emulate a multitasking computer architecture, including multitasking emulated CPU 170 and multitasking emulated OS 180, which support parallel processing of various processes and thread of execution of the computer program 160.

In order to enable emulation of several processes of a computer program 160, the emulation engine 120 may maintain the following resources and information about various processes and threads of execution: An image of the executable machine code associated with the program 160; Memory (e.g., some region of virtual memory in the isolated computer environment), which includes the executable code, process-specific data (input and output), a call stack (to keep track of active subroutines and/or other events), and a heap to hold intermediate computation data generated during run time; Operating system descriptors of resources that are allocated to the process, such as handles, data sources and sinks; Security attributes, such as the process owner and the process' set of permissions (allowable operations); and Processor state (context), such as the content of registers, physical memory addressing, and the like. The state is typically stored in emulated CPU registers when the process is executing, and in virtual memory otherwise. The emulated OS 180 may hold most of this information about active processes in data structures called process control blocks (PCB). Any subset of resources, but typically at least the processor state, may be associated with each of the process' threads or child processes in the emulated OS 180. The emulated OS 180 may also provide mechanisms for inter-process communication to enable interaction between various processes and threads.

Figure 6:
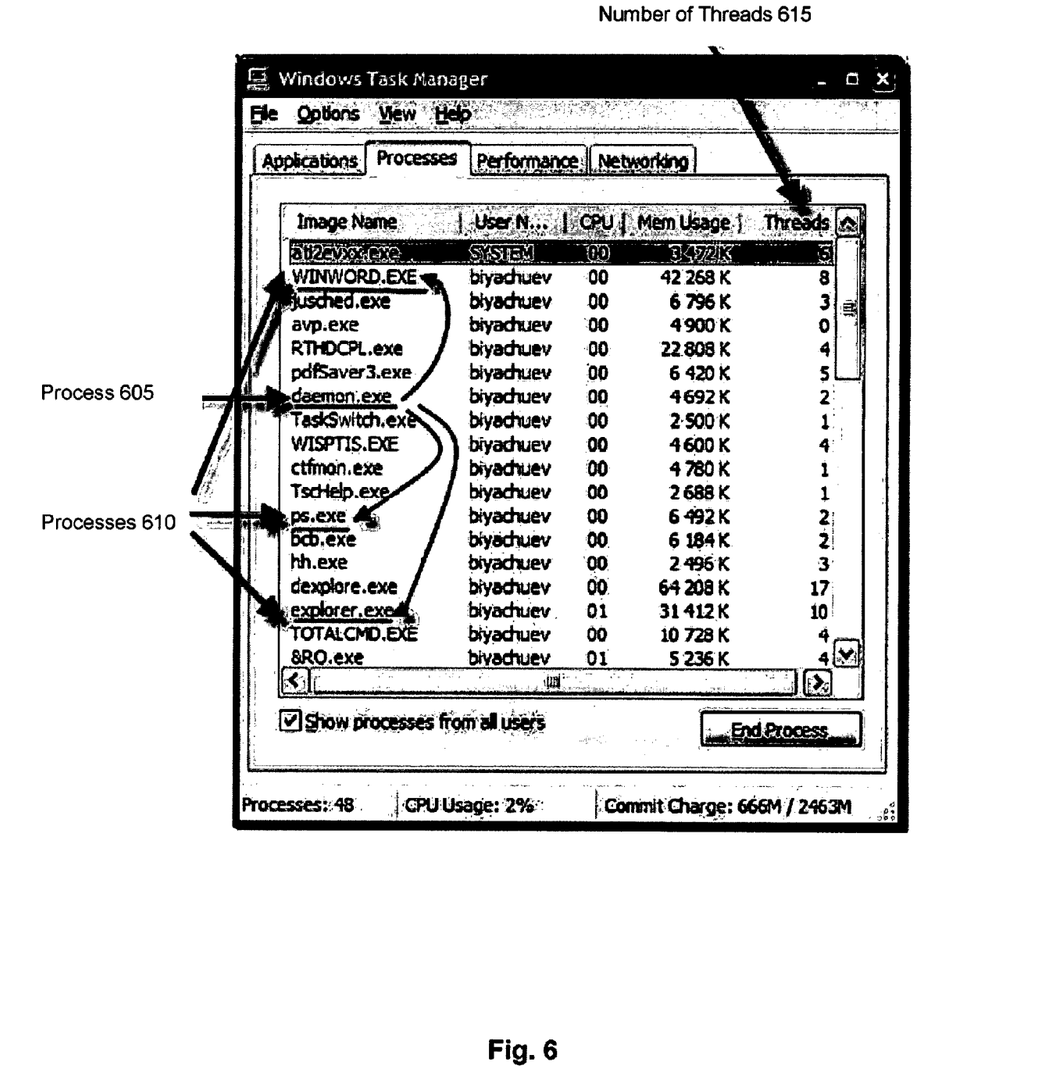
FIG. 6 illustrates a Microsoft Windows® task manager interface depicting example processes running remote threads of a computer program.

In an example embodiment, emulation engine 125 may also emulate one or more threads of execution of the computer program 160 with each thread performing one or more specific execution task. Multiple threads may share the same program code, operating system resources (such as memory and file access) and operating system permissions (for file access as the process they belong to). In an example embodiment, emulation engine 125 may be operable to emulated various local and remote threads of execution of the computer program 160. Typically, a process has at least one "local" thread (or just thread) of execution. Remote threads may be defined as threads created by a process of the computer program 160 in processes of other programs, which may or may not have been activated by the program 160. In a Microsoft Windows® environment, the CreateRemoteThread( ) function may be used to create remote threads. Once created, remote threads belong to the processes in which they are created and thus may execute separately from the processes of program 160 which created them. FIG. 6 depicts an example windows task manager interface illustrating execution of example program 160. Process 605, i.e., daemon.exe, is the main process of the program 160 and it has two threads of execution. Processes 610, i.e., winword.exe, ps.exe and explorer.exe, are concurrently running processes that execute remote threads of process 605.

Figure 3:
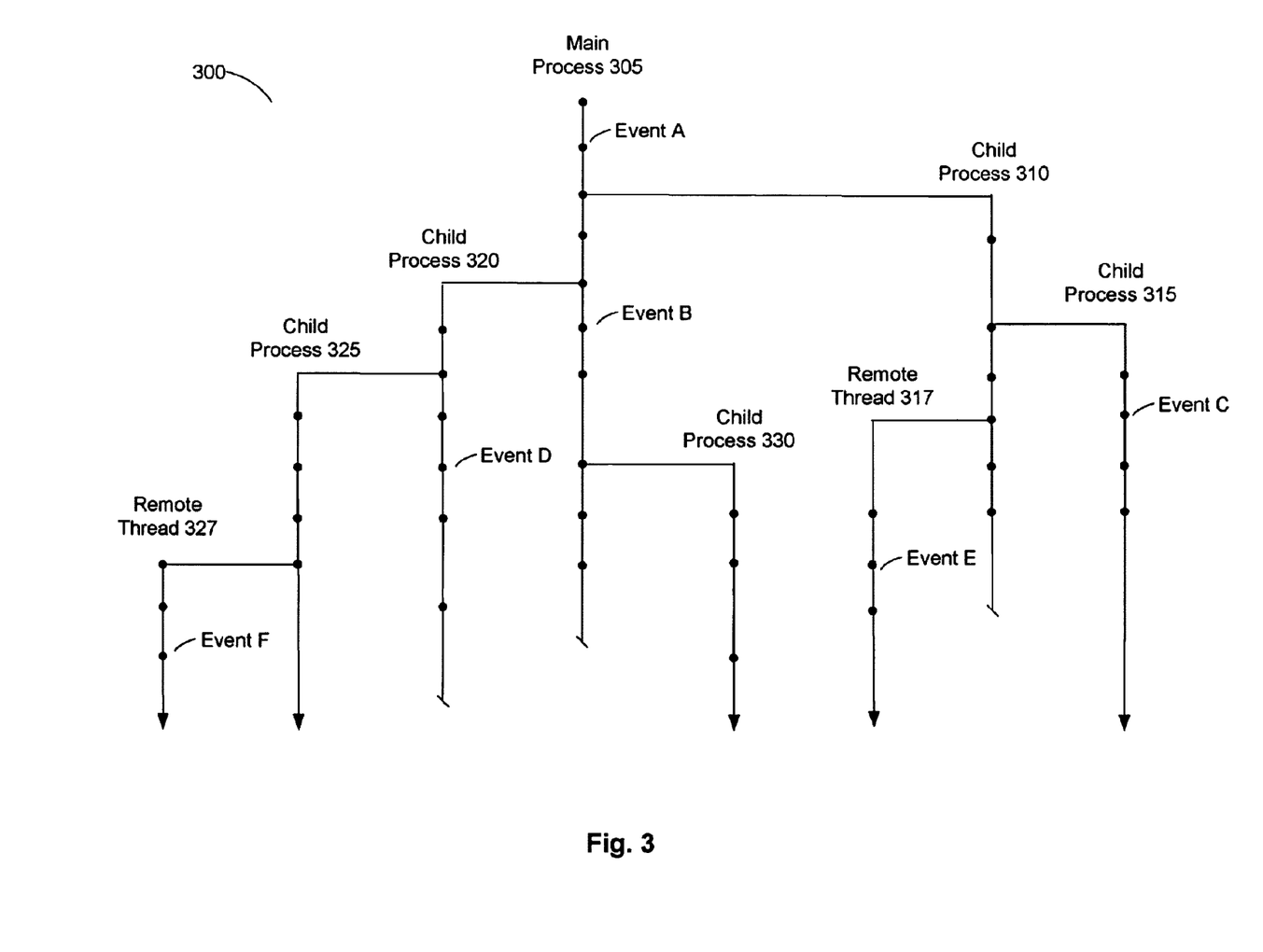
FIG. 3 illustrates an example diagram of operation of a multi-component program.

The execution of a multi-component program may be better understood with reference to FIG. 3, which depicts a schematic flow diagram 300 of program execution by emulation engine 125. In the diagram, vertical lines represent various processes of execution of a multi-component program and dots represent events generated by the various processes during program execution. More specifically, the computer program begins its execution with a main process 305, which generates various events, including event A. The main process 305 then spawns two child processes, 310 and 320, and continues its execution generating various events, including event B, and a third child process 330. The child process 310 spawns a child process of its own, process 315, and activates a remote thread 317 in another process. The child process 310 then terminates its execution while its child process 315 and remote thread 317 continue execution and generate, inter alia, events C and E. Child process 320 generates a child process of its own, process 325, and generates, inter alia, event D, before terminating its execution. The child process 325 in turn activates a remote thread 327 in another system process, which generates, inter alia, event F. The emulation engine 125 is operable to continue emulation of various processes depicted in diagram 300 even after termination of one or more processes until a determination is made whether or not the emulated computer program exhibits signs of malicious behavior, as discussed below.

Again with reference to FIGS. 1 and 2, in one example embodiment, the antivirus software may also include event detector 140, which facilitates detection of events generated by the emulated computer program 160 and its various executable components. The detected events may include one or more system calls, such as native system calls and API calls, and system responses to these calls. Example events that may be detected by the event detector 140 include, but are not limited to, the computer program making a copy of itself, the computer program creating a new file, the new file copying itself into OS system catalog, the computer program creating a new key in the OS registry, modifying the registry, and the like. It should be noted that events detected by the event detector 140 are not only events necessarily indicative of malicious behavior of the computer program or its executable components. The detected events may be harmless events generated by a benign program, such as a legitimate program, which does not cause any apparent harm to the computer system 100. The detected events are then sent in real time to event analyzer 145 for further processing.

Figure 4:
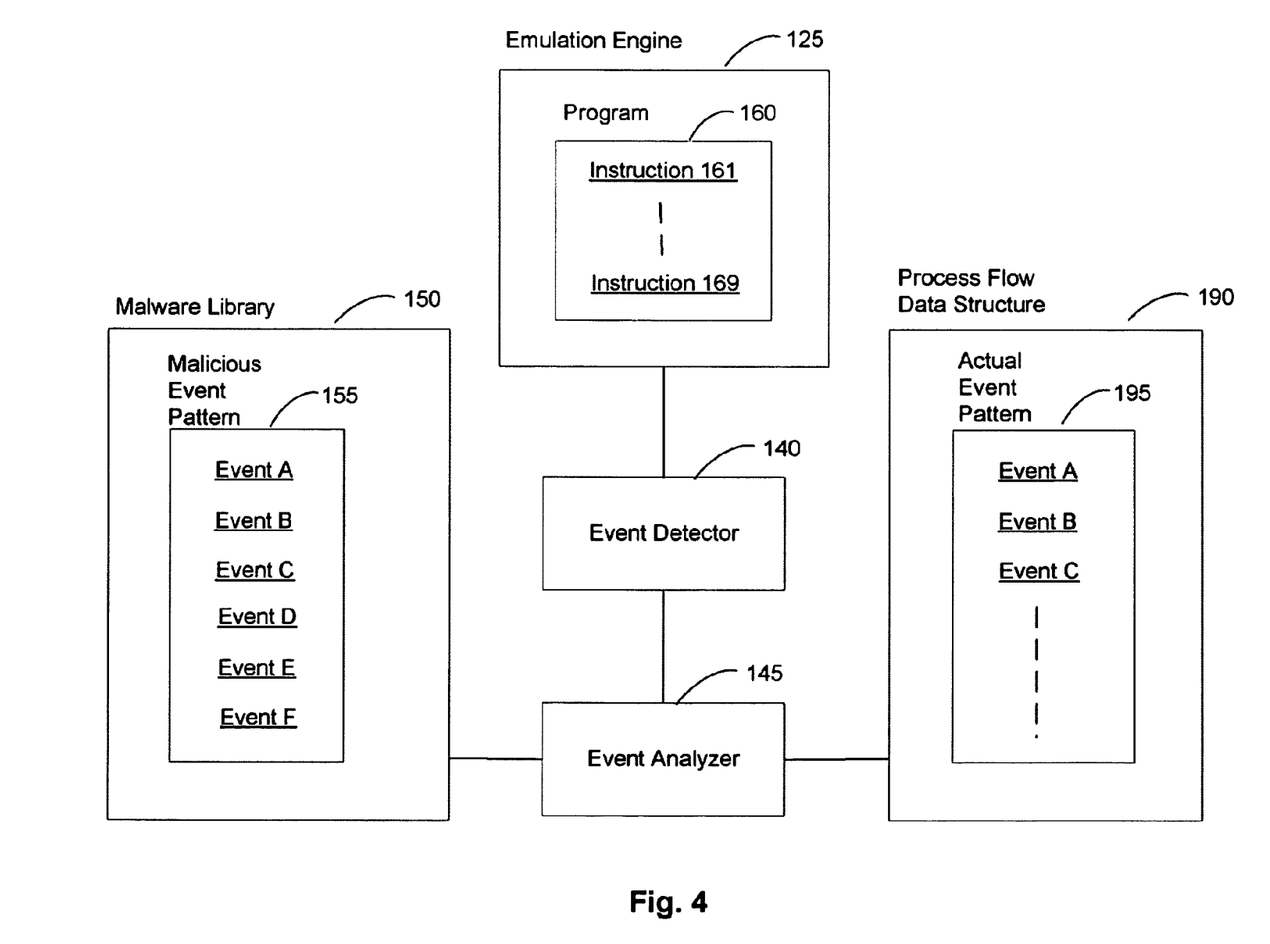
FIG. 4 illustrates an example data structure for detecting a multi-component malware.

In one example embodiment, the antivirus software also includes an event analyzer 145 configured to perform heuristic analysis of detected events in order to determine whether or not the emulated computer program exhibits signs of malicious behavior. Operation of the event analyzer 145 will be described next with reference to FIGS. 3 and 4. As indicated above, FIG. 3 depicts a flow diagram of an example execution flow of a multi-component computer program. FIG. 4 depicts a schematic diagram of example data structures maintained by event analyzer 145 in order to detect multi-component malware in the emulated computer program 160. In particular, event analyzer 145 maintains a malware library 150, which includes various patterns of malicious events associated with various classes of computer malware, such as viruses, worms, Trojan horses and the like. An example pattern of malicious events 155 associated with a particular instance of malware may include events A through F, which may be implemented in the given order or in another order to have harmful effect on computer system 100. In addition, events A through F may be separated by any number of intervening events, known as wildcards.

During emulation of computer program 160 in emulation engine 125, event detector 140 detects events generated by emulated computer program 160 and various executable components thereof and passes the detected events to event analyzer 145. Event analyzer 145 compares the received event data with known patterns of events associated with malicious programs, such as a pattern 155. Thus, during execution of the main process 305, event detector 140 detects and reports to event analyzer 145 the occurrence of event A, which is identified with the malicious event pattern 155. Event analyzer 145 compares the detected event with all known event patterns 155 and stores in a process flow data structure 190 an indication that event A occurred during emulation of computer program 160. In this manner, event analyzer 145 compares all received event notifications and constructs in data structure 190 a pattern of potentially harmful events generated by various executable components of emulated computer program 160. When one or more events in the actual event pattern 195 match events in the malicious event pattern 155, event analyzer 145 may make a determination that emulated computer program 160 exhibits malicious behavior. If the actual event pattern 195 does not at least in part match any of the malicious event patterns 155, event analyzer 145 may conclude that emulated computer program 160 is benign.

It should be noted that in the example above, individually each executable component of the computer program 160 may not exhibit signs of malicious behavior. For example, main process 305 may not contain all events identified in the malicious event pattern 155, nor do its child processes 310, 320 and 330, nor their child processes 315 and 325, nor the remote threads 317 and 327. However, in totality, individual events generated by several executable components may form a pattern of events which is identified by event analyzer 145 as being malicious. Accordingly, the emulated computer program 160 may be identified as malware and may be cleaned, quarantined or removed from the computer system 100.

Figure 5:
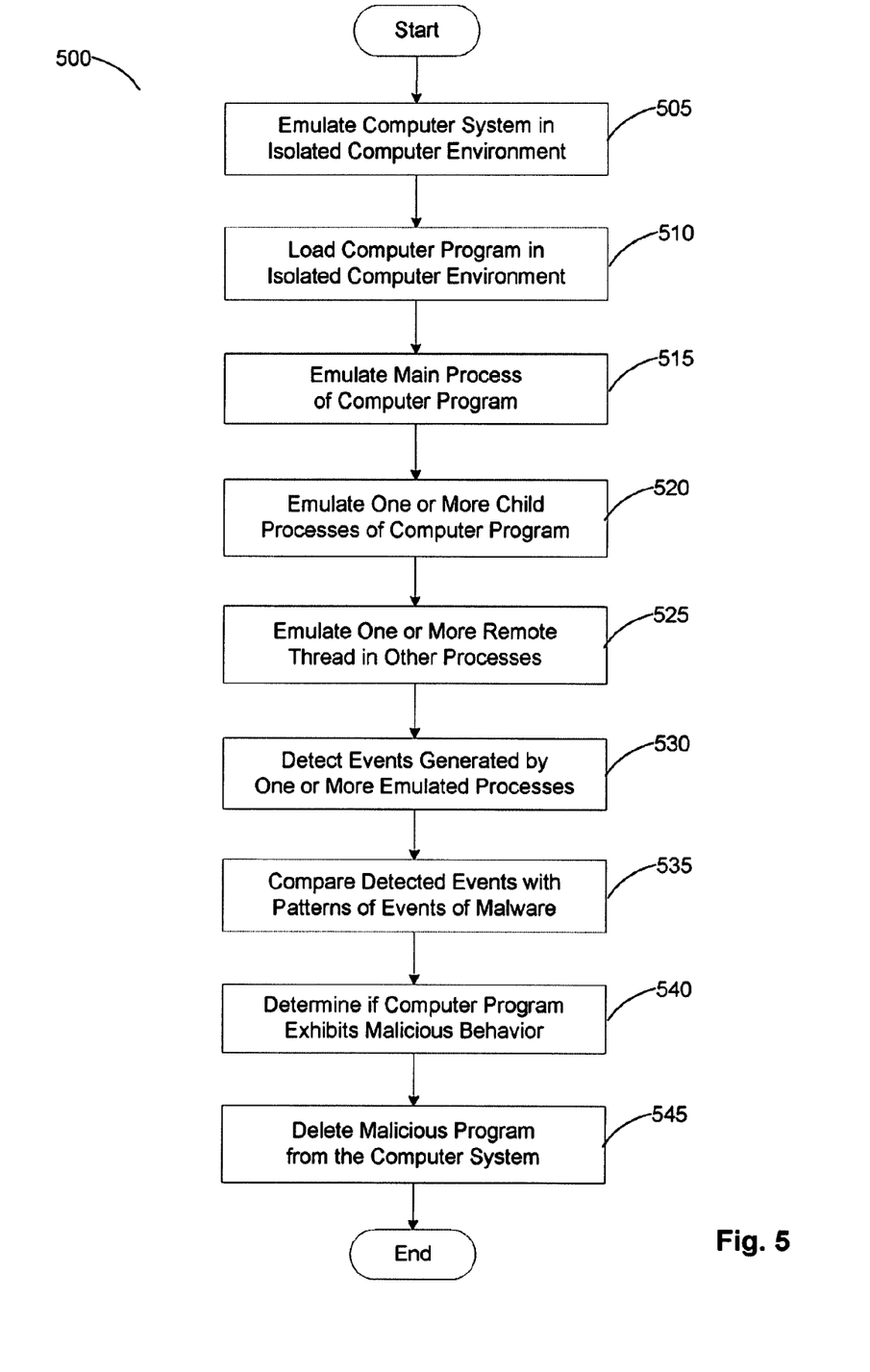
FIG. 5 illustrates an example process for detecting a multi-component malware.

FIG. 5 illustrates an example process 500 for detecting multi-component malware. At step 505, an antivirus software program emulates in an isolated computer environment at least a part of a computer system. At step 510, the antivirus software loads a computer program into the isolated, secure computer environment. At step 515, the antivirus software emulates the main process of the computer program. At step 520, the antivirus software emulates one or more child processes of the computer program. At step 525, the antivirus software activates one or more remote threads in other system processes and emulates execution of these processes. Those of skill in the art will realize that steps 515-525 may be performed in parallel as well as consecutively. It should be also noted that while some processes or remote threads may be terminated, the antivirus software may continue emulation of other processes to assure thorough heuristic analysis of behavior of the computer program.

Next, at step 530, the antivirus software detects, substantially in real time, events generated by the emulated processes and/or remote threads of the computer program. It should be noted that since some of the processes and remote threads may be executed in parallel, the consecutively detected events may correspond to different processes and/or threads. The term substantially in real-time refers to detection and/or processing of events during emulation of the computer program and not after emulation has been completed. At step 535, the antivirus software compares one or more detected events with one or more patterns of events attributed to known malware programs, such as viruses, worms and Trojans. At step 540, the antivirus software determines, based on the comparison, if the emulated computer program exhibits signs of malicious behavior. At step 545, if the emulated program is determined to be malicious, the malicious program may be repaired, quarantined or removed from the computer system 100.

Next provided are several examples of the detection of multi-component malware using techniques described herein. In one example, an antivirus software loads a parent program into an isolated computer environment for emulation. During emulation, the program may exhibit the following behavior. At startup, the emulated program checks if it was started from the Microsoft Windows® OS directory, and, if not, it creates in the OS directory a child program named nstask32.exe, which is a copy of the parent program. The parent program launches the child program with certain parameters indicating path to the location of the parent program. The parent program then terminates itself. The child program checks to see if it was launched from the Microsoft Windows® OS directory, which it was. The child program then extract a malicious file, such as Backdor.Win32.sdbot.at and runs it. The child program assures its autostart by modifying the OS registry: HKEY_LOCAL_MACHINE\Software\Microsoft\ Windows\CurrentVersion\Run". Then, the child program analyzes parameters of the command string received during start up, and extracts a complete path to the file of the parent program. The child program then suspends all activity for several seconds to complete execution of the parent program. Lastly, the child program removes the file of the parent program from the system and terminates its own execution.

Heuristic analysis of the behavior of the parent and child programs indicate that each program is benign. In particular, the parent program copies itself into Microsoft Windows® system catalog and executes itself. The child program places a certain file into the system and starts it. It then autostarts itself and removes a certain file. Thus, individually, neither parent nor child programs exhibit malicious behavior. However, the totality of events generated by the parent and child programs indicate that a parent program creates its own copy in the Microsoft Windows® system catalog and launches it. It then places into the system a new file and starts it. It then assures its own autostart and removes its original file. The totality of these actions as being attributed to the parent program indicates with high probability that the emulated computer program exhibits signs of Trojan-Generic malware.

In another example, the antivirus software emulates a parent program, which extracts and starts two child programs. The parent program terminates its execution. The first child process copies the parent program into the Windows® system folder under the name file1. This action is not considered to be malicious, because it may be performed by installer programs. The second child process creates a key in the OS registry, which assures autostart of file1 during system startup. This action separately also cannot be considered as malicious, because in some cases legitimate programs may provide for their own autostart or the autostart of other programs. Thus, none of the three programs individually exhibit malicious behavior. However, actions of all three programs, if attributed to the parent program alone, indicate malicious behavior. In other words, the parent program (1) places a file into the system, (2) creates its own copy in the Windows® system catalog, and (3) autostarts its own file. The totality of these actions as being attributed to the parent program indicates with high probability that the emulated computer program exhibits signs of Trojan malware.

Yet in another example, the antivirus software emulates a parent program, which extracts and runs four child programs. The parent program then terminates its own execution. The first child process copies the parent program into the catalog dir1 under the name file1. This action is not considered to be malicious, because it may be performed by installer programs. Similarly, the second and third child processes copy the parent program into catalog dir1 under names file2 and file3, respectively. The fourth child process creates a certain registry key, which sets the catalog dir1 as a default catalog of the file exchange in a peer-to-peer network (P2P). This action on its own is not considered harmful either. Thus, individually, none of the parent or child processes exhibit malicious behavior. However, actions of all four programs, if attributed to the parent program alone, indicate malicious behavior. In other words, the parent program (1) places some files into the system, (2) creates several copies thereof in the catalog dir1, and (3) sets catalog dir2 as the default catalog for file exchange in peer-to-peer networking. The totality of these actions as being attributed to the parent program indicates with high probability that the emulated computer program exhibits signs of Worm.P2P.Generic malware.

Yet in another example, the antivirus software emulates a parent program, which searches among executed OS processes for the Internet Explorer® process. Once found, the parent process creates a remote thread in the Internet Explorer® process. The remote thread loads from a specified URL a malicious file and runs it in the isolated computer environment. (The antivirus software may provide a dummy file for emulation purposes.) Individually, these actions of the parent process and remote thread may be considered benign. However, actions of the parent process and its remote thread, if being attributed to the parent program alone, indicate malicious behavior. In other words, the parent program (1) creates a remote thread and (2) loads some file from the Internet and runs it. The totality of these actions as being attributed to the parent program indicates with high probability that the emulated computer program exhibits signs of Trojan-Downloader malware.

Yet in another embodiment, the antivirus software emulates a parent program, which launches a standard Windows application "notepad.exe" and sets the status of the process to suspended. The parent process creates a remote thread 1 in the "notepad" process. The parent process then launches standard Microsoft Windows® OS application "calc.exe" and also sets status of the program to suspended. The parent process then creates a remote thread 2 in the "calc" process. The parent program then searches among executed OS processes for the Internet Explorer® process and creates remote thread 3 in that process. Then, the parent process terminates its execution. Next, remote thread 1 copies the parent program into the Windows® system folder within the "notepad" process. Remote thread 2 provides for the autostart of the copy of the parent program located in the OS file folder. Lastly, remote thread 3 loads from a specified URL a malicious file and runs it in the isolated computer environment. Individually, these actions of the parent process and remote thread may be considered benign, e.g., performed by legitimate programs. However, actions of the parent process and its remote threads, if attributed to the parent program alone, indicate malicious behavior. The totality of these actions as being attributed to the parent program indicates with high probability that the emulated computer program exhibits signs of Trojan-Downloader malware.

In accordance with this disclosure, the components, process steps, and/or data structures described herein may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. Where a method comprising a series of process steps is implemented by a computer or a machine and those process steps can be stored as a series of instructions readable by the machine, they may be stored on a tangible medium such as a computer memory device (e.g., ROM, PROM and EEPROM, FLASH Memory, Jump Drive and the like), magnetic storage medium (e.g., tape, magnetic disk drive and the like), optical storage medium (e.g., CD-ROM, DVD-ROM and the like) and other types of program memory.

Furthermore, it is to be understood that the phraseology or terminology herein is for the purpose of description and not of limitation, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such. The various embodiments disclosed herein encompasses present and future known equivalents to the known components referred to herein by way of illustration. More over, while embodiments and applications have been shown and described, it would be apparent to those skilled in the art having the benefit of this disclosure that many more modifications than mentioned above are possible without departing from the inventive concepts disclosed herein.

What is claimed is:

1. A computer-implemented method for detecting malicious program behavior, comprising:
   emulating at least a part of a computer system in an isolated computer environment;
   emulating execution of the computer program in the isolated computer environment, including emulating execution of one or more remote threads of the computer program;
   detecting events being generated by the one or more remote threads of the emulated computer program;
   determining, substantially in real time, whether each detected event is associated with malicious program behaviors;
   storing in a data structure only detected events associated with the malicious program behaviors;
   comparing a totality of events stored in the data structure for the emulated computer program with one or more event patterns associated with the malicious program behaviors; and
   terminating emulation of the computer program if, based on the comparison, the totality of events stored in the data structure for the emulated computer program corresponds to one of the event patterns associated with the malicious program behaviors.

2. The computer-implemented method of claim 1, wherein individually events generated by the one or more emulated remote threads of a malicious computer program exhibit benign behavior.

3. The computer-implemented method of claim 2, wherein emulating execution of two or more remote threads of the computer program includes one or more of:
   executing two or more remote threads in parallel; and
   executing two or more remote threads sequentially.

4. The computer-implemented method of claim 3, further comprising continuing emulating execution of one or more remote threads of the computer program even when one or more remote threads are terminated.

5. The computer-implemented method of claim 4, wherein detecting an event includes detecting at least one of one or more program's system calls and one or more system responses to the program's system calls.

6. The computer-implemented method of claim 1, wherein the one or more remote threads of the emulated computer program are created by one or more processes of the emulated computer program.

7. The computer-implemented method of claim 6, wherein the one or more remote threads are created in programs activated by the emulated computer program.

8. A system for detecting malicious program behavior, comprising:
 a system memory; and
 a processor configured to
  emulate in an isolated computer environment of the system memory at least a part of a computer system;
  emulate in the isolated computer environment execution of the computer program, including execution of one or more remote threads of the computer program;
  detect events being generated by the one or more remote threads of the emulated computer program;
  determine, substantially in real time, whether each detected event is associated with malicious program behaviors;
  store in a data structure only detected events associated with the malicious program behaviors;
  compare a totality of events stored in the data structure for the emulated computer program with one or more event patterns associated with the malicious program behaviors; and
  terminate emulation of the computer program if, based on the comparison, the totality of events stored in the data structure for the emulated computer program corresponds to one of the event patterns associated with the malicious program behaviors.

9. The system of claim 8, wherein individually events generated by the one or more emulated remote threads of a malicious computer program exhibit benign behavior.

10. The system of claim 9, wherein execution of two or more remote threads of the computer program includes one or more of:
 execution of two or more remote threads in parallel; and
 execution of two or more remote threads sequentially.

11. The system of claim 10, wherein the processor is further configured to continue emulating execution of one or more remote threads of the computer program even when one or more remote threads are terminated.

12. The system of claim 11, wherein the processor is further configured to detect at least one of one or more program's system calls and one or more system responses to the program's system calls.

13. The system of claim 8, wherein the one or more remote threads of the emulated computer program are created by one or more processes of the emulated computer program.

14. The system of claim 13, wherein the one or more remote threads are created in programs activated by the emulated computer program.

15. A computer-readable medium comprising computer-executable instructions for detecting malicious program behavior, the computer-executable instructions include:
 instructions for emulating in an isolated computer environment at least a part of a computer system;
 instructions for emulating execution of the computer program in the isolated computer environment, including instructions for emulating execution of one or more remote threads of the computer program;
 instructions for detecting events being generated by the one or more remote threads of the emulated computer program;
 instructions for determining, substantially in real time, whether each detected event is associated with malicious program behaviors;
 instructions for storing in a data structure only detected events associated with the malicious program behaviors;
 instructions for comparing a totality of events stored in the data structure for the emulated computer program with one or more event patterns associated with the malicious program behaviors; and
 instructions for terminating emulation of the computer program if, based on the comparison, the totality of events stored in the data structure for the emulated computer program corresponds to one of the event patterns associated with the malicious program behaviors.

16. The computer-readable medium of claim 15, wherein individually events generated by the one or more emulated remote threads of a malicious computer program exhibit benign behavior.

17. The computer-readable medium of claim 16, wherein instructions for emulating execution of two or more remote threads includes instruction for one or more of:
 executing two or more remote threads in parallel; and
 executing two or more remote threads sequentially.

18. The computer-readable medium of claim 17, further including instructions for continuing emulating execution of one or more remote threads of the computer program even when one or more remote threads are terminated.

19. The computer-readable medium of claim 18, wherein instructions for monitoring include instructions for monitoring at least one of one or more program's system calls and one or more system responses to the program's system calls.

20. The computer-readable medium of claim 15, wherein the one or more remote threads of the emulated computer program are created by one or more processes of the emulated computer program.

* * * * *